P. SWENSON.
SAFETY STARTING CRANK FOR EXPLOSIVE ENGINES.
APPLICATION FILED OCT. 1, 1910.
982,898.
Patented Jan. 31, 1911.
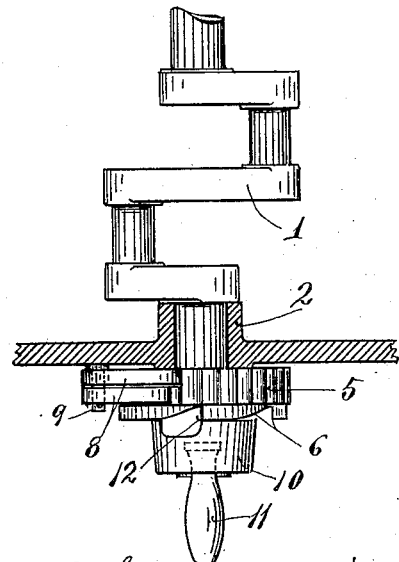
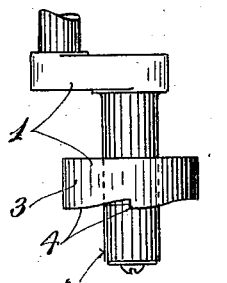
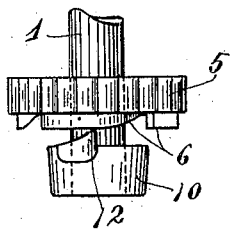
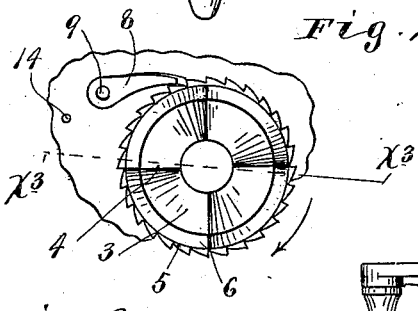
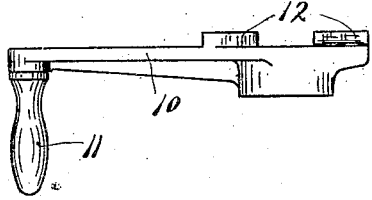
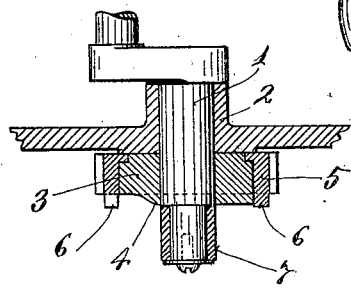
Witnesses.
A. H. Opsahl.
Harry Opsahl.
Inventor.
Paul Swenson
By his Attorneys
Williamson Merchant

UNITED STATES PATENT OFFICE.

PAUL SWENSON, OF WEST MINNEAPOLIS, MINNESOTA.

SAFETY STARTING-CRANK FOR EXPLOSIVE-ENGINES.

982,898.

Specification of Letters Patent.  Patented Jan. 31, 1911.

Application filed October 1, 1910.  Serial No. 584,800.

*To all whom it may concern:*

Be it known that I, PAUL SWENSON, a citizen of the United States, residing at West Minneapolis, Hopkins P. O., in the county of Hennepin and State of Minnesota, have invented certain new and useful Improvements in Safety Starting-Cranks for Explosive-Engines; and I do hereby declare the following to be a full, clear, and exact description of the invention, such as will enable others skilled in the art to which it appertains to make and use the same.

My invention has for its object to provide a simple and highly efficient safety starting crank for explosive engines and, to this end, it consists of the novel devices and combinations of devices hereinafter described and defined in the claims.

As is well known, many serious accidents, such as broken arms and ribs, have been produced by back explosions in the engine while attempting to start the same by the use of a crank.

My invention provides a very simple device whereby, if a back explosion takes place in starting the engine, the initial backward thrust on the crank shaft will disconnect the crank from the crank shaft and thereby render such back explosions and resulting backward rotations of the crank shaft harmless.

In the accompanying drawings which illustrate the invention in its preferred form, like characters indicate like parts throughout the several views.

Referring to the drawings, Figure 1 is a view partly in plan and partly in horizontal section and with some parts broken away, showing a portion of the crank shaft of an explosive engine, and my improved safety crank mechanism applied thereto; Fig. 2 is a front elevation of the parts shown in Fig. 1, with the starting crank removed; Fig. 3 is a view partly in plan and partly in horizontal section on the line $x^3$ $x^3$ of Fig. 2; Fig. 4 is a plan view of certain of the parts shown in Fig. 1 and showing the position of the starting crank when it is thrown into an inoperative position; Fig. 5 is a plan view, showing the outer end of the engine crank shaft and a ratchet faced hub applied thereto; and Fig. 6 is a plan view of the starting crank.

The engine crank shaft 1 may be of the usual or any suitable construction and, as shown, it is journaled near its outer end in a bearing 2, through which it projects.

Keyed or otherwise secured to the engine crank shaft 1 is a hub 3 that is provided, in its outer face, with ratchet teeth 4. Journaled on the hub 3 is a ratchet wheel 5 provided with the customary peripheral ratchet teeth but having, also, a laterally projecting rim which forms laterally projecting ratchet teeth 6. The ratchet teeth 4 and 6 project in the same direction, but the latter surround the former and project laterally slightly farther outward than the said ratchet teeth 4, as best shown in Fig. 3. The extreme front end of the crank shaft 1 is shown as slightly reduced and provided with an anti-friction sleeve 7 which, however, constitutes no part of the present invention, but simply serves as a spindle to receive and center the starting crank. The running movement of the crank shaft 1 is assumed to be in the direction of the arrow marked on Fig. 2, and in this direction, the annular ratchet wheel 5 is adapted to run with the hub 3. The said ratchet wheel is, however, normally held against rotation in the reverse direction by one or more retaining pawls. Preferably, two retaining pawls 8, of slightly uneven lengths, are pivotally connected to the bearing 2 by a stud 9. Normally, the pawls 8 are gravity-held in engagement with the peripheral teeth of the ratchet wheel 5. This ratchet wheel 5 operates as a tripping wheel, as will presently more fully appear.

The starting crank 10 may be of any suitable construction and, so far as the broad idea of my invention is concerned, may take various forms and might, in some instances, be in the form of a starting wheel. The term "crank" is, therefore, herein used in a very broad sense. At its free end, the crank 10 is provided with a hand piece 11, and on the inner face of its hub, it is provided with one or more lugs or projections for engagement with the ratchet teeth 4 and 6. As shown, the said lever is provided with diametrically opposite lugs 12 which are so extended that they will engage simultaneously with alined teeth 4 and 6.

When the engine is to be cranked or started, the retaining dogs 8 must be engaged with the peripheral teeth of the tripping wheel 5. Then the crank is applied, as shown in Fig. 1, with its lugs 12 engaged with the alined teeth 4 and 6 of the hub 3 and tripping wheel 5, respectively. This being done, the engine crank shaft 1 can be rotated in the proper direction to start the engine, to-wit, in the direction of the arrow in Fig. 2, the same as if the crank were used in the ordinary way or with the ordinary ratchet device; and when the engine crank has acquired speed in the direction of the said arrow, the starting crank will be disengaged from the coöperating ratchet device automatically and substantially in the ordinary way. If, however, a back explosion should take place while starting the engine, the pawls 8 will prevent backward rotation of the tripping wheel 5 and the said wheel is then held so that its laterally projecting teeth 6 have a cam action on the crank lugs 12 which will force the same outward beyond and out of engagement with the teeth 4 of the hub 3. Otherwise stated, under the initial backward movement of the engine crank shaft, the teeth 4 of the hub 3 impart a very slight backward movement to the starting crank 10 but the relatively fixed cam acting teeth 6 immediately force the said lever laterally and disengage its lugs from the backward moving teeth 4. The slight rearward movement thus imparted to the starting crank is not sufficient to do any harm to the person holding the crank. After the engine crank shaft has acquired a high speed in the direction of the arrow in Fig. 2, the rapping or pounding action on the free ends of the dogs 8 will throw the same backward and into inoperative positions, preferably against a stop 14 applied to the bearing 2, and this relieves the said pawls from wear and prevents noise when the engine is running.

The device described is extremely simple and of small cost and has been found efficient for the purposes had in view.

What I claim is:

1. The combination with an engine shaft, of a ratchet faced hub secured thereto, a tripping wheel loosely mounted on said hub and provided with peripheral teeth and with lateral teeth, a retaining pawl engageable with the peripheral teeth of said tripping wheel, to prevent backward rotation thereof, and a crank having a lug engageable with the laterally projecting teeth of the said hub and tripping wheel, and adapted to be disengaged from the former, by the action of the latter, under initial backward movement of said shaft.

2. The combination with an engine shaft provided with a rigidly secured hub, through which one end of said shaft projects, the said hub having laterally projecting ratchet teeth, a tripping wheel journaled on said hub and provided with peripheral ratchet teeth and with laterally projecting ratchet teeth, the latter of which project laterally slightly beyond the teeth of said hub, a retaining pawl engageable with the peripheral teeth of said tripping wheel to prevent backward rotation thereof, and a crank having a driving lug engageable with the laterally projecting teeth of said hub and tripping wheel and adapted to be disengaged from the former, by the latter, under initial backward movement of said shaft.

In testimony whereof I affix my signature in presence of two witnesses.

PAUL SWENSON.

Witnesses:
 E. F. CODDINGTON,
 HARRY B. DYER.